United States Patent [19]
Lemelson

[11] Patent Number: 5,123,006
[45] Date of Patent: Jun. 16, 1992

[54] HIGH DENSITY RECORDING AND REPRODUCTION SYSTEM AND METHOD

[76] Inventor: Jerome H. Lemelson, 868 Tyner Way, Call Box 14-286, Incline Village, Nev. 89450

[21] Appl. No.: 330,814

[22] Filed: Mar. 30, 1989

Related U.S. Application Data

[63] Continuation-in-part of Ser. No. 13,127, Feb. 10, 1987, abandoned, and a continuation-in-part of Ser. No. 815,933, Feb. 3, 1986, Pat. No. 4,642,705, which is a continuation-in-part of Ser. No. 405,996, Aug. 6, 1982, Pat. No. 4,578,717.

[51] Int. Cl.$^5$ ................................ G11B 5/00
[52] U.S. Cl. ...................... 369/100; 360/18; 360/55
[58] Field of Search ............ 360/18, 55, 110, 76; 369/100, 109, 118

[56] References Cited

U.S. PATENT DOCUMENTS 4,486,792 12/1984 Edakubo .......................... 360/64 X
4,618,901 10/1986 Hatakeyama et al. ........... 369/100 X Primary Examiner—Robert L. Richardson
Attorney, Agent, or Firm—Steven G. Lisa

[57] ABSTRACT

High density recording systems and methods are disclosed which employ a radiation beam to form spot-like recordings in record members such as discs, tapes and cards. The angle, offset or cross-sectional shape of the recording beam can be varied so as to vary the angle, offset or shape of the corresponding recordings in the record member. The recorded information can be electro-optically or magnetically detected and discriminated from each other to provide high density recordings of alpha-numeric characters or digital data. Enhanced detection scanning is effected by ultrasonically vibrating the laser or an optical element, such as a prism or mirror receiving the reading light beam, in a manner to cause it to scan back and forth laterally to the record track as a longitudinal scanning movement is effected parallel to the longitudinal axis or centerline of the track. The reflected light is detected, computer processed and analyzed to effect proper detection of the recordings to generate correct data therefrom.

52 Claims, 3 Drawing Sheets

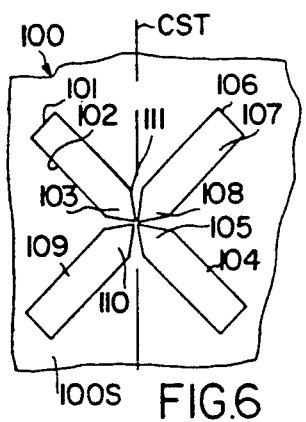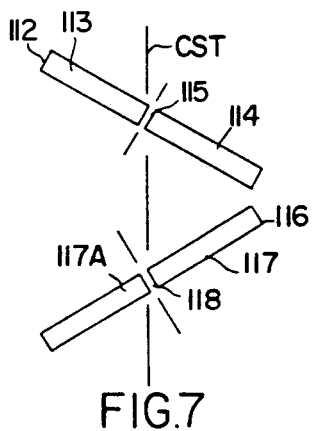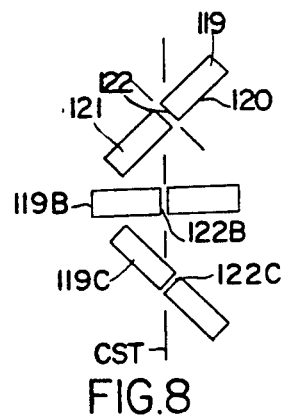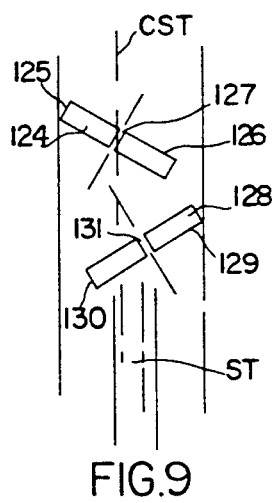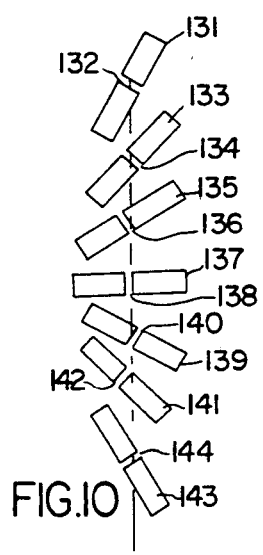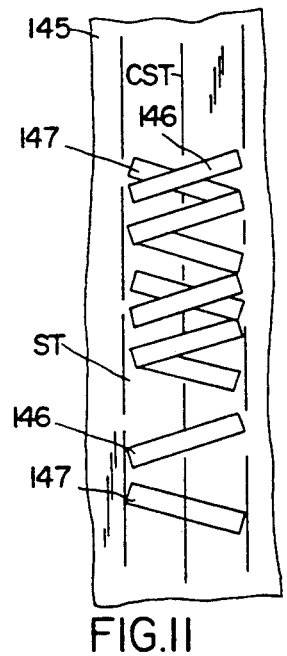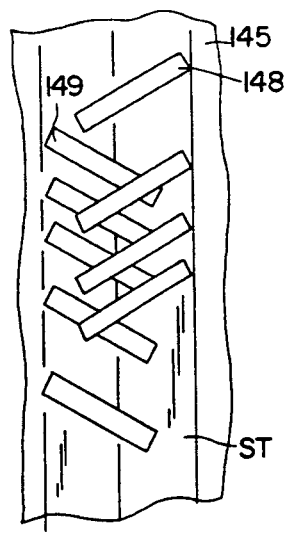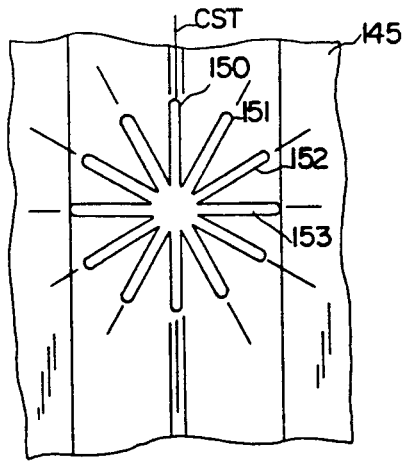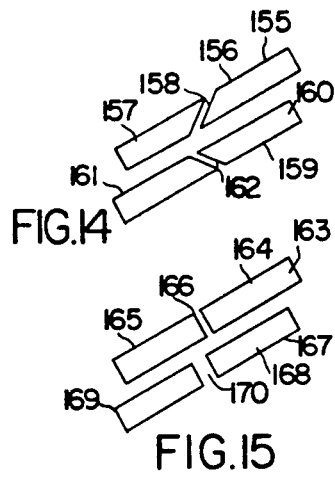

HIGH DENSITY RECORDING AND REPRODUCTION SYSTEM AND METHOD

CROSS-REFERENCE TO RELATED APPLICATIONS

This is a continuation-in-part of application Ser. No. 013,127 filed Feb. 10, 1987 and now abandoned, as a continuation-in-part of Ser. No. 815,933 filed Jan. 3, 1986, now U.S. Pat. No. 4,642,705, which is a continuation-in-part of Ser. No. 405,996, filed Aug. 6, 1982, now U.S. Pat. No. 4,578,717.

BACKGROUND OF THE INVENTION

1. Field of the Invention

This invention is in the field of recording and reproduction apparatus and methods for effecting high density bit type recordings on record members such as cards, tapes and discs. Recording densities are substantially enhanced by varying either the angles of elongated magnetic or electro-optically scannable recordings provided at select recording locations of a record track or variably shaping and discriminating, upon reproduction thereof, the configurations of the bit recordings along a record track of a record member.

2. The Prior Art

The prior art consists of magnetic recording systems in which a transducer effects the recording of magnetic domains along a record track of a magnetic recording material, wherein each of the domains so formed extends in a given direction. In the case of electro-optically scannable recordings, such have been provided in the configuration of elongated pits or cavities which extend parallel to the recording axis of the record track and/or directly therealong.

SUMMARY OF THE INVENTION

This invention relates to an apparatus and method for transducing information with respect to select tracks of a record member, such as a record card, tape or disc, and particularly to improvements in apparatus for recording on and reading same employing magnetic and/or radiation-electro-optical recording and reading means.

In conventional recording employing a magnetic recording member, such as a tape, disc or card, or a member which is radiation sensitive, bit recordings of information are effected by either magnetic domains which are formed parallel to each other by magnetic fields generated across the recording gap of magnetic recording transducer or, in the case of optical recordings, by pulsing a laser beam directed at a record track of a record member, in a manner to vaporize and form an elongated cavity or pit extending parallel to the record track. Such domains or cavities are provided at spaced-apart locations of the record track of the record member and each defines a bit or pulse recording which extends at the same angle to the record track as the other bit or pulse recordings to provide, for example, the binary notations "0" or "1". The result is a binary-type series of recordings extending longitudinally along the record track, each of which bit or pulse recordings defines a particular program or information recorded in coded digital form. Such digital recordings are provided as discrete magnetic domains, elongated cavities or otherwise formed electro-optically scannable spots when the recording transducer is pulsed and its magnetic field or radiation is aligned with the record track along which the recording is effected. Such signal recording is effected in a manner whereby recording densities of between 20,000 and 40,000 bits per inch may be achieved without difficulty utilizing magnetic transducers of conventional design.

The instant invention provides means for substantially increasing such recording density by what is termed herein as "overlap-recording", a process in which two or more recordings of data, such as digital data, are provided along the same length of the same record track or along very closely spaced record tracks with very little, if any, guard band areas therebetween, wherein each recording is composed of respective longitudinal arrays of parallel magnetic domains or elongated cavities which overlap or extend close to the domains or cavities of the other recordings. By differently angling and/or overlapping the magnetic domains or elongated cavities of each recording, they may be separately discriminated by a suitable similarly angled magnetic pick-up or a suitable electro-optical detector or series of detectors, thus providing two ore more different recordings along the same length of record track.

Accordingly it is a primary object of this invention to provide new and improved recording systems and methods for recording two or more recordings along the same length of the same track of a record member.

Another object is to provide a recording system and method employing one or more recording and/or reproduction transducers which may be controllably pivoted about their central axes to selectively align them with a select track of a record member so as to selectively record along and/or read from such select track.

Another object is to provide a new and improved high density electro-optical recording and reproduction system and method employing recordings of code or byte-defining information in the form of microminiature indicia of substantially the same scale or size but different in shape.

Another object is to provide a high density electro-optical recording and reproduction system and method employing recordings of code or byte-defining information defined by microminiature narrow elongated indicia which vary in orientation with respect to the axis of a record track wherein the specific orientation of each indicia, when detected, is an indication of a specific or select byte of data or code.

Another object is to provide a high density electro-optical recording and reproduction system which has a substantially greater recording density than the density of conventional pulsed laser beam recording methods.

Another object is to provide a high density electro-optical recording arrangement employing means for recording indicia of different select shapes.

Another object is to provide a high density electro-optical recording arrangement for recording spot-like areas of the same shape but differently oriented.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

BRIEF DESCRIPTION OF THE DRAWINGS

FIG. 6 is a face or plan view of the gap-containing end of a portion of a magnetic head assembly showing two magnetic transducers disposed at right angles to each other and operable to scan and transduce with respect to the same track of a magnetic record member.

FIG. 7 is a face view of the gap-containing end of a portion of a magnetic head assembly showing two magnetic transducers, with the recording gap of each transducer being azimuthed or angulated differently with respect to a single record track of a record member, and where such transducers simultaneously scan and transduce information along the record track.

FIG. 8 is an end or face view of the gap-containing end of a magnetic head assembly having three magnetic transducers which are closely spaced with their recording-reproduction gaps aligned to scan the same record track of a magnetic record member, but each angulated differently from the others.

FIG. 9 is an end or face view of the gap-containing end of a portion of a magnetic head assembly having two transducers which are offset or staggered with respect to each other, wherein each has a different gap angle for providing magnetic recordings or domains which overlap each other along the same record track.

FIG. 10 is an end or face view of a magnetic head assembly having a plurality of aligned magnetic transducers, each with a different gap azimuth for recording and reproducing a plurality of different digital recordings along the same length of the same record track of a magnetic record member.

FIG. 11 is a greatly magnified view of a portion of a magnetic record member showing a portion of a single record track thereof and magnetic domains defining pulse recordings of different information recorded along the same section of track, wherein the domains of one recording have an azimuth or azimuths different from the domains of the other recording, and wherein certain of the domains of one recording overlap respective domains of the other recording.

FIG. 12 is a view of a portion of a magnetic record member showing magnetic domains of one recording partially overlapping the domains of another recording along the same track.

FIG. 13 is a face view of a magnetic recording at a select location of a magnetic record member which recording is formed of four magnetic domains, each at an azimuth or longitudinal angle which is different from that of the others a degree such that each may be separately detected.

FIG. 14 is an end or face view of a portion of a magnetic head assembly showing two closely spaced magnetic transducers with pole gaps constructed to provide recordings in the form of magnetic domains which are differently aligned as a result of differently orienting such pole gaps.

FIG. 15 is a face view of a portion of a magnetic head having two closely spaced magnetic transducers, one for recording and the other for reproducing digital magnetic signals and applicable to the transducer arrangements illustrated in others of the drawings.

In FIGS. 1 to 3 are shown details of a magnetic recording and reproduction apparatus which is capable of recording digital record signals, such as audio, video or computer generated signals along parallel tracks of a flexible magnetic tape, card, disc or drum as relative movement is effected between a stationary or rotating head or heads and a magnetic recording member, such as a tape which is driven around the peripheral surface of the drum or disc as it rotates or along parallel tracks of a cylindrically deformed magnetic record against which the disc or drum rotates. Conventional magnetic bit or pulse code recording is effected by energizing a magnetic field to be intermittently generated across the recording gap of the transducer in the vicinity of the surface of the magnetic recording member and generating such pulse recordings as a multitude of closely spaced magnetic domains, the longitudinal axes of which extend parallel to each other at an angle with respect to the longitudinal axis of the track of the record member, which angle depends upon the angle of the gap of the transducer.

Figure 1:
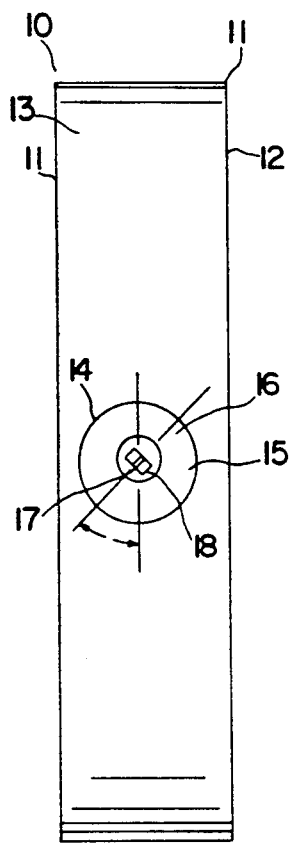
FIG. 1 is a side view of a modified magnetic transducer assembly including a disc or drum for supporting one or more magnetic transducers for use in recording on and/or reproducing from a magnetic record tape or a cylindrically deformed magnetic record card.
Figure 2:
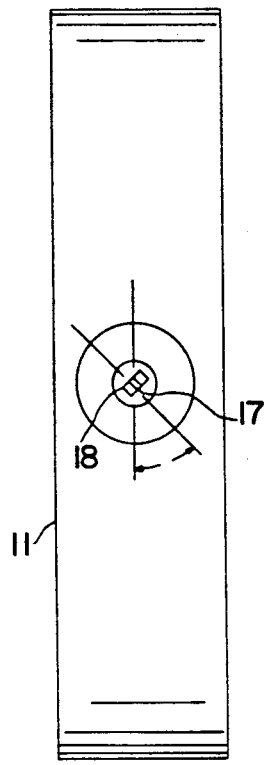
FIG. 2 is a side view of the transducer assembly of FIG. 1 with the transducer rotated to provide the azimuth or angle of its gap at a discrete and select angle to that of the gap of the transducer of FIG. 1.
Figure 3:
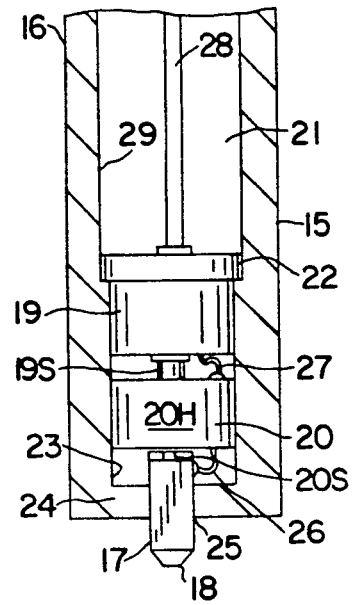
FIG. 3 is a side view with parts broken away for clarity of a transducer assembly of the type employed in FIGS. 1 and 2.

To further increase recording density in such a magnetic recording arrangement, means are provided in FIGS. 1 to 3 for effecting two or more information or data recordings, such as programs or respective streams of data, along the same length of magnetic record track of a magnetic card, tape, disc or drum, using an apparatus having a magnetic recording transducer or transducers which are modified to permit the recording and/or reproduction head or heads or the operating ends containing the field gaps thereof, to be power pivoted or rotated between two or more different angular positions. At each angular position the recording head may record information in digital or pulse form by providing respective magnetic domains which are substantially similarly angled for each recording or program but which are differently angled with respect to the longitudinal axis of the record track than other data recordings provided therealong, such as other streams of data or programs which may be simultaneously or sequentially recorded along the same track. By similarly pivoting and aligning a magnetic transducer utilized to reproduce from a selected recording or program from a record track containing a number of different recordings or programs which are respectively defined by respective groups of magnetic domains recorded with their axes extending in the same direction or parallel to each other, such reproduction transducer Will sense only one of such multiple recordings [e.g.—that with which its pole pieces are properly aligned] to the exclusion of the other recordings therealong which have magnetic domains extending at an angle or angles to the longitudinal axis of the magnetic domains of the selected recording.

Each of the multiple recordings is thus rendered discrete from the others depending upon the angle of which its domains or bit recordings extend with respect to the axis of the record track. Such technique may be utilized to provide a means for substantially increasing the total amount of data which is recorded on a single magnetic record member, such as a magnetic tape, rigid or flexible disc, magnetic card, drum or the like.

In FIG. 1, a magnetic recording apparatus 10 includes an assembly 11 including a drum or disc-shaped support 12 which has one or more magnetic transducers 17 supported thereby. The transducer or transducers are shown as both rotatable about an axis and projectable in the direction of such axis from the peripheral surface 13 of the disc or drum 12, in a manner to permit the operating end of the transducer to engage or become disposed in close operable relationship with a magnetic record or tape as the support 12 is power rotated. Each transducer 17 is pivotally rotatable about an axis which extends radially with respect to the drum or disc 12 to permit either or both the magnetic recording and reproduction of two or more discrete recordings of data or programs along the same length of the same record track. Each recording or program is defined by magnetic domains, the axes of which extend parallel to each other or are similarly angled with respect to the longitudinal axis of the track. Such domains are differently angled with respect to the domains of one or more other recordings or programs extending along the same track length, each of which is recorded by the same or different magnetic recording heads during recording operations when the magnetic pole pieces thereof are at respective select angles with respect to the direction or longitudinal axis of the record track of the magnetic recording member. As such, the differently angled domain recordings permit the selective reproduction of each of such recordings to the exclusion of and without interference from the other one or more program recordings.

In FIG. 1, a cylindrical bore 14 is provided in the body of the disc or drum shaped housing 12, which bore extends to the peripheral surface 13 of the peripheral wall of the disc shaped housing 12. Force fitted within such bore 14 is an elongated cylindrical housing 16 forming part of an assembly 15 which includes a magnetic transducer 17 and a plurality of actuators or motors for both pivotally and axially driving the transducer or transducers 17 thereof to permit its gap angle to be selectively changed and the transducer or transducers to be engaged against or operatively close to the surface of a magnetic record member.

Transducer 17 may comprise either a magnetic recording or reproduction head or both, depending on the manner in which its induction coil or coils are wired and extend. The operating end 18 of the magnetic transducer 17 consists of a convention pole piece assembly which has been pivoted counterclockwise, as viewed, and is shown angled 45° to a plane passing through the central axis of the transducer and the center of the circular record track of the record member being scanned.

In FIG. 2, the transducer 17 is shown rotated and positioned at right angles to the position shown in FIG. 1 or 45° to the other side of the described plane. As a result the transducer 17 can record or reproduce information defined by magnetic domains which extend at right angles to the direction of the domain defined by the recordings effected by the transducer when in the position shown in FIG. 1.

FIG. 3 shows details of the transducer 17 and its positioning means, which comprise a miniature push-pull solenoid or lineal actuator 19 and a rotary solenoid 20. The solenoid 19 is secured or force fitted in a first bore 22 defining part of the interior volume 21 of the elongated cylindrical housing 16. The stepped cylindrical wall of the solenoid housing conforms to the surface 22 of the bore 21, while the lower portion of the side wall of such lineal solenoid conforms to lower wall surface 23 having a reduced diameter at the end of the bore. A rotary solenoid or stepping motor is secured to the output shaft 19S of the solenoid 19 and its housing 20H is slidably engaged with the cylindrical bore 23 to permit it to move longitudinally therethrough as solenoid shaft 19S is actuated. The magnetic transducer or head 17 is secured to the power rotated output shaft 20S of the rotary solenoid or motor 20 and extends through an opening 25 in the end wall 24 of the elongated housing 16. Shaft 19S of solenoid 19 is preferably assembled and constructed to prevent its rotation so that the only rotation which can be imparted to the transducer 17 is that which results from rotation of the output shaft of rotary solenoid 20.

Notation 26 refers to a slack flexible conducting cable extending from the operating element or coils of the transducer 17 t solenoid housing 20H. Notation 27 refers to a second flexible cable containing the wire of cable 26 plus wires connected to the energizing input of the rotary solenoid 20 and extending therebetween and the housing for the lineal solenoid 19. A third electrical cable 28 extends from the solenoid 19 to suitable commutating means located near the center of the drum or disc-shaped housing 12 and contains all of the above described wires plus wires connected to the energizing input of solenoid 19.

The transducer support and actuator assembly 15 may be modified, depending on transducing and scanning requirements. For example, the entire assembly 15 or the head 17 may be supported to permit the head to float or to be retained 0.00024 or so away from the record member by the Bernouli effect, thus precluding the need for a lineal actuator of the type described. Air may also be forced from the interior of the housing 16 through a passageway in or between the transducer 17 and the opening 25 in the end wall 24 of the housing to provide such a gap between the end 18 of the transducer 17 and the flexible or rigid record member. The solenoid 19 may also be air operated with air pressurized by a pump or fan connected to the interior volume 21.

Figure 4:
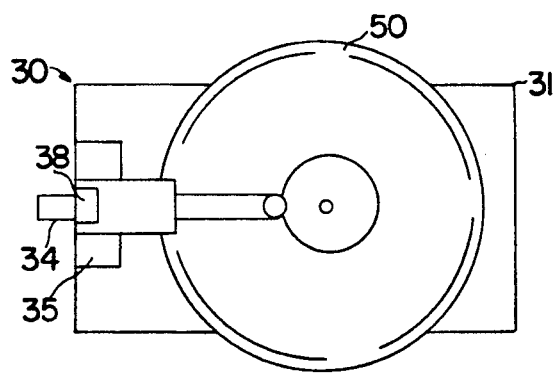
FIG. 4 is a plan view of a magnetic disc drive employing a pivotable transducer assembly of the type illustrated in FIG. 3.
Figure 5:
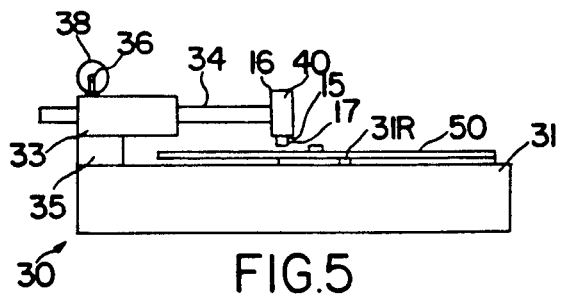
FIG. 5 is a side view of the magnetic disc and drive assembly of FIG. 4.

The transducer assembly 16 or a modified form thereof may be employed to support and selectively pivot one or more transducers with respect to selected magnetic recording tracks of a magnetic tape, rigid or flexible disc or card. In FIGS. 4 and 5 is shown a disc drive for a flexible or rigid magnetic recording disc 50. The disc drive assembly 30 is supported on a base 31 which supports a constant speed gear motor (not shown) and a turntable 31R supporting the record disc 50 beneath an assembly including a support 35 for a lineal bearing 33 supporting an arm 34 for radial movement therethrough with respect to the rotating disc 50. Supported at the end of arm 34 is a housing 40, equivalent to housing 16 and containing similar components including a magnetic transducer 17 or a bank of transducers which may be projected towards and away from the magnetic recording surface of the disc and rotated between two or more angular positions as described above. Supported on the housing for bearing 33 is a reversible gear motor 38 and a drive 36 operable to permit such motor to rapidly drive the arm 34 to position the transducer 17 in operable alignment with any selected track of the disc. Conventional drive and control means may be employed for effecting rapid controlled reverse drive of the arm 34 across the rotating magnetic disc 50. Magnetic transducer assembly 16 is supported in a housing 40 which positions the end of the magnetic transducer 17 or a plurality of transducers immediately above, floating or in engagement with the upper surface of the magnetic disc 50 to permit it to selectively transduce different recordings from the same length of the select circular record tracks, as described above, by the controlled and selective rotation of the transducer between two or more rotational positions.

The above-described lineal and/or rotational driving movements and the selective positioning of the transducer, as well as the other operations of the described magnetic transducing apparatus, are preferably all under the control of an electronic computer or microprocessor, so as to effect the selective recording and/or playback of data with respect to the magnetic recording member.

In FIG. 6 is shown a portion of a magnetic head 100 composed of one or more arrays of magnetic transducers supported by a substrate 100S, which is supported adjacent a magnetic record member, as described, for recording on and/or reproducing record signals from a magnetic record card, tape or disc. Two magnetic heads 101 and 106 are shown with their magnetic pole pieces 102, 104 and 107, 109 aligned and at right angles to the pole pieces of the other. Notations 103, 105, 108 and 110 refer to tapered portions of respective of the pole pieces 102, 104, 107 and 109, the ends of which define the respective transducing gaps of the heads 101 and 106. Both heads thus share a common gap area or volume across which respective magnetic fields or flux lines are generated at right angles to each other so as to provide respective arrays of magnetic domains in the same recording track of the magnetic record member scanned by the head 100. Each of the arrays contains domains which are angled or azimuthed at a right angle to the longitudinal axis of the other domains formed by the magnetic field of the other head. The magnetic transducers 101 and 106 may be formed by so-called thin film fabrication techniques of Permalloy magnetostrictive materials, such as vapor deposited iron-manganese or nickel-iron alloys, as described in the March 1982 and March 1984 issues of the Journal of Applied Physics and may be but one pair of a plurality of closely pairs of similarly constructed assembly of magnetic transducers.

Each of the transducers 101 and 106 may be simultaneously and/or sequentially energized with respective streams of digital data for the simultaneous or sequential recording of the different programs, messages or streams of information along the same end or different portions of the same magnetic record track.

FIG. 7 illustrates a modified form of the magnetic transducing arrangement of FIG. 6, and schematically shows the attitude of two magnetic transducers 113 and 116 which are formed on a common substrate, as described, closely adjacent to each other. The transducers are operable to record respective signals or trains of data along the same record track, the axis of which track is denoted CST. One transducer 113 is formed of aligned magnetic pole pieces 112 and 114 having a magnetic recording and/or reproduction transducing gap 115 separating the operating ends of such pole pieces. Such transducer is angled on its support to provide the longitudinal axis or azimuth of the gap 115 at an acute angle which is clockwise of the track axis CST. The other transducer 116 is disposed on the same support or head substrate with its pole pieces 117 and 17A separated by a transducing gap 118 with its axis at an acute counterclockwise angle to the longitudinal axis CST of the same track. The magnetic domains thus aligned or formed along the same record track by respective pulses of magnetic field energy across the two gaps are thus at respective azimuths or angles which are such that they may be separately reproduced from the same length of record track by respective magnetic reproduction transducers angled as in FIG. 7. As in FIG. 6, a plurality of additional pairs of similarly disposed transducers for recording on and/or reproducing from the same lengths of the same record track of a magnetic record member may be provided on a common support or substrate to provide a bank or banks of such transducers which may be used with the apparatus described above or modifications thereof.

In FIG. 9 is shown a transducer arrangement composed of two transducers 124 and 128 which are supported on a common substrate as described. Transducer 124 has pole pieces 125, 126 separated by a gap 127 for recording and/or reproducing signals in the form of domains in the magnetic recording material of a selected track ST of a magnetic record member as described. The magnetic domains are formed at an azimuth angle or are angulated at an acute angle which is clockwise of the centerline CST of the selected record track. Transducer 128 has the centerline of its gap 131 offset from the centerline of the gap 127 of transducer 124, a degree less than the width of a record track and is angulated at an acute angle which is counterclockwise to the longitudinal axis CST of the selected magnetic record track. The two transducers may thus be employed to provide respective arrays of magnetic domains, certain or all of which partly overlay, as shown in FIG. 12. The substrate or support containing the transducers 124 and 128 may contain a plurality of such pairs of offset or staggered transducers in side-by-side, closely spaced arrays and or additional transducers of the same array which are additionally offset and differently angled with respect to the longitudinal recording axis of a track or closely spaced parallel tracks of a magnetic record member.

FIG. 10 shows an array of seven transducers denoted 131,133,135,137,139,141 and 143, closely supported on a common head or substrate and having respective signal recording and/or reproduction gaps denoted 132,134,136,138,140,142 and 144 which are longitudinally aligned to record along a common magnetic record track. However, each of the seven transducers and its gap is angulated differently from the others to provide respectively angulated arrays of magnetic domains along the same length of a record track, each of which arrays may be separately detected by a magnetic pickup having a respectively aligned magnetic field gap. As in FIG. 9, two or more of the multiple transducers of FIG. 10 may be offset from the others to provide respective arrays of magnetic domains, as recordings, which partially overlap.

In FIG. 11 is shown two separate recordings along the same length of a single magnetic track of a magnetic record member formed by transducing arrangements of FIGS. 6 or 7 or of those of FIGS. 8 and 10 when two of the recording transducers thereof are separately energized with pulse recording information such as digital recording signals. The record member 145 has a record track ST, the centerline CST of which is aligned with the recording axis of a plurality of magnetic transducers, such as 113 and 116, which respectively receive and are energized with respective streams of digital data or pulses defining respective recordings to be made. Gaps 115 or 144 may be employed, for example, to record a plurality of domains 146 extending at one angle to axis CST after gaps 118 or 132 have recorded a plurality of spaced-apart domains 147 which define a recording different from the recording defined by the overlapping domains 146. Depending upon the timing and nature of the digital code recordings provided by each transducer, not all of the domains will overlap, as illustrated. Some domains will be completely spaced apart, as shown, while other will overlap different degrees, but no two overlapping domains will completely cover or mask the other, thus permitting each domain to be detected or sensed by a properly aligned pick-up or reproduction head.

In FIG. 12 a record track ST of a record member 145 is shown containing two arrays of domains 148 and 149, the latter being first recorded along the left side portion of the track after which the array of domains 148 are recorded along the right side portion of the same track such as by staggered transducers arranged as illustrated in FIG. 9. Here again, the degree of overlapping will depend on the timing and nature of the digital or code signals of each recording or message applied to the respective transducers, and certain of the domains will be free of overlapping when recorded while the transducer for recording the differently angled adjacent domain array is not energized. The recording arrangement shown in FIG. 12 may be modified to provide additional arrays of adjacent domains at angles which are different than those shown. Left and right side domain arrays may also be formed of domains which are parallel and or laterally aligned for detection by respectively staggered pick-ups with suitably directed detection magnetic field gaps.

In FIG. 13 is shown a pulse recording at a single recording location. The recording is composed of either four domains 150,151,152,153, or eight domains, the longitudinal axes of which extend through a point or common recording area of a select record track ST of a magnetic record member 145. Each of the differently angulated transducers, such as illustrated in FIG. 10, or by a single pivotable transducer of the type shown in FIG. 3 during consecutive scanning sweeps of the track ST while the transducer thereof is driven to a different recording angle by a selectively operated stepping motor or solenoid, as previously described, forms domains which can be individually detected by a properly aligned pickup or reproduction head.

FIG. 14 illustrates yet another arrangement of magnetic transducers on a common substrate for providing plural magnetic recordings along the same length of magnetic record track with one or both recordings formed of magnetic domains which overlap the domains or recordings of the other. Two magnetic transducers 155 and 159 are shown, each composed of respective pairs of pole pieces 156, 157 and 160, 161 which are aligned with each other and extend parallel to the aligned pole pieces of the other. However, the gaps 158 and 162 of the respective heads are angulated with respect to each other and are aligned so as to provide respective recordings which extend along the same track and may overlap but are separately detectable by respective pick-ups or sensors of the same or different heads.

FIG. 15 shows a magnetic recording transducer 163 and a magnetic reproduction transducer or pick-up 167 respectively formed of pole pieces 164,165 and 168,169 supported on a common substrate or head, as described, and extending substantially parallel and close to each other in the manner such that the recording gap 166 of the recording transducer 163 extends in the same direction as the sensing or pick-up gap 170 of the reproduction transducer 167. In other words, both gaps are similarly angulated with respect to the longitudinal axis of a common record track of a magnetic record member when the record member and the head or substrate supporting the two transducers are properly aligned for scanning by either or both said transducers during a recording and/or reproduction operation. The width of the recording gap 166 is shown as less than the width of the reproduction gap 170 in accordance with known design practice and requirements for effecting suitable magnetic recording along narrow record tracks of magnetic recording members such as tape, discs and cards.

A plurality of closely spaced pairs of magnetic recording and reproduction transducers may be provided aligned or offset as illustrated in substitution for each or a select number of the single magnetic transducers illustrated.

In a particular method of recording and reproducing digital data in the form of streams of digital codes, such as binary codes and the like, along a selected track or tracks of a magnetic record member, a single message or stream of such digital data may be simultaneously applied to two recording transducers, the recording gaps of which are longitudinally aligned with the recording track but differently angulated, as in FIG. 7, to permit the simultaneous recording of the same data along the same track and in the form of respective arrays of domains. The domains are respectively angulated and overlap as in FIG. 11 to 13 so as to permit the recordings of each array to be simultaneously reproduced and compared in an electronic comparator to provide a parity check or system for automatically ascertaining if digital data is properly recorded. As a result, the need for extra recording tracks is eliminated as the two arrays of recordings are recorded along the same length or lengths of the same track and selectively reproduced therefrom as described.

FIGS. 6–15 may also schematically represent recording arrangements relating to the electro-optical recording and reproduction of coded or binary or decimal information provided by one or more laser beams which are pulsed in their operation, either while fixed with respect to the record member or during scanning movement thereacross, in a manner to physically or chemically change selected spot-like areas of a record member at selected recording locations, as effected, for example, by means of the apparatus disclosed in my U.S. Pat. Nos. 3,818,500; 4,084,198; 4,121,249; 4,398,223; and 4,511,930 or other patents which relate to and define laser recording and the electro-optical reproduction of such recordings on discs, tapes, cards and the like. Such spot-like recordings are generally elongated in shape and have been defined by elongated cavities formed by vaporizing material of the surface stratum of a record member, or a layer therebelow.

Accordingly, the apparatus 10 of FIGS. 1-3, the apparatus illustrated in FIGS. 4 and 5 and that shown in FIGS. 6-10 may be modified whereby the magnetic transducers thereof are each replaced by one or more lasers including a recording laser and means for generating its recording light beam as a pulse of radiation having a defined cross-sectional shape such as to produce elongated pulse recordings along record members of the types generally illustrated in FIGS. 11-15 or otherwise shaped cavities or recordings which may be selectively discriminated from each other by means of a single electro-optical receiver and detector which is selectively rotatable on a mount, as described, or by means of respective of a plurality of different photoelectric detectors, each of which is operable to detect a light reflected from reading laser thereof when it intersects a respectively oriented elongated pulse recording of the types illustrated in the drawings. In other words, each of the illustrated transducers of the drawings may be replaced by a respective recording laser and/or a respective electro-optical scanning means which may include such laser or another laser together with a photoelectric detector of the reflected light.

Such recording beam may have an elongated narrow cross-section which results in cavities or otherwise provided recordings having configurations and attitudes somewhat like those illustrated in FIGS. 11-15. Detection and discrimination of such differently angulated elongated pulse recordings as information may be effected in one or more manners, including, in addition to the selective electro-optical detection of each oriented pulse recording by a selectively oriented electro-optical scanning means, an optical correlation system which recognizes each selectively oriented pulse recording to the exclusion of the others as scanning is effected or each of a plurality of pulse recordings which is of a different shape than the other pulse recordings existing along a record track of the record member which is scanned during playback.

Laser generated cavity pulse recordings of the types described may also be selectively varied in shape and-/or orientation by providing differently shaped and/or differently oriented openings of the same shape in a disc shaped mask which is either continuously or selectively rotated through the axis of a laser beam while the beam is controllably pulsed when select openings of select shape or orientation are aligned with the beam axis. Such a system employs a master controller or computer to control relative scanning movement between the beam and the record member, the timed pulsing of the laser and the rotation of the mask disc. Additionally, a feedback signal may be provided indicating the rotation of the mask to effect such select cavity recordings.

RECORDING TECHNIQUES

The following recording techniques may be employed to effect optically or electro-optically scannable pulse recordings along a record track of a record member of the types illustrated, but not confined to, FIGS. 11-15 of the drawings:

1. The beam is generated as a pulse of circular or otherwise symmetrical cross-sectional shape and is caused to move a short distance in a given direction at an angle to the longitudinal axis of the record track as it is generated, so as to form differently shaped cavities or recording configurations in the record member for each pulse or decimal recording. A plurality of such differently shaped pulse recordings may be provided at each recording location, each of which is optically or electro-optically discriminable from the other pulse recordings thereat by suitable optical correlation or electro-optical scanning mean.

2. The beam is generated with a narrow line-like cross-sectional shape, the longitudinal axis of which extends at a selected angle to the direction of the record track or track axis during scanning so as to provide the recordings as respective cavities of elongated shapes, such as shown in FIGS. 11-15 of the drawings.

3. The pulses of recording radiation are generated with a cross-sectional shape which varies in a manner such that, when two different recordings are effected with pulses of each recorded at the same spot-like locations of pulses of other recordings, the resulting composite pulse recordings may be electro-optically discriminated from each other by one or more techniques, including detecting a select portion or portions of each recording to the exclusion of the remaining portion of such spot-like recording, optically and/or electronically discriminating the shape of one spot-like recording from another, discriminating variations in color or reflectivity of one spot-like recording from another to others of such spot-like recordings, etc. Such optical and/or electronic discriminating techniques may be supplemented with the optical and/or electronic detection of the length or degree of angulation of each spot-like recording which is scanned and detected to add to the variations in information recorded and detected.

4. Where recordings are effected which are defined by spot-like areas of a record member or track thereof which vary in shape and/or angulation with respect to the longitudinal axis of a record member, such variations may be optically discriminated to provide respective electrical signals representing different data or recordings, such as messages and programs, by so called optical correlation means wherein the optical image or a select portion of each spot-like recording is compared with a corresponding image or images derived from a mask or window of a select shape or an optical recording or memory from which the scanning light is reflected or through which it passes. Such memory may comprise a photoelectric detector of select shape or masked with such a select shape defining the mask opening or blocking area, such that the output thereof is either maximum or zero when correlation occurs between the image of the select spot-like recording and the active or deactivated area of the mask. Such selectivity shaped mask or detector may be selectively rotated about an axis by a automatically controlled mechanism, such as shown in FIG. 3, or may be one of a plurality of detectors fixed on a mount, each specifically shaped to optically or electro-optically detect and discriminate spot-like recordings of the same shapes and-/or angulation with respect to the longitudinal axis of the record track of the record member containing the recordings.

5. If the reading radiation beam is of a select cross-sectional shape corresponding to the shape of select pulse recordings provided along a single record track being reproduced from, or corresponding to those pulse recordings which are similarly angled with respect to the longitudinal axis of the record member, then when such reading beam intersects an area of the record member containing a similarly shaped pulse recording, the light thereof may be totally absorbed, diffracted or reflected depending on the type of recording, and such condition may be electro-optically and electronically detected to effect detection of the presence of the select pulse recording to the exclusion of other pulse recordings of different shape and/or angulation.

6. In other embodiments of the invention, a record member such as a card, sheet, tape, or disc may contain a recording layer or stratum capable of containing a plurality of different data recordings therein, such as one or more forms of magnetic recordings effected by one or more techniques and a laser beam generated recording, such as cavities of the type or types described above. Such record member may have, as an outer layer or a layer beneath the surface thereof, a magnetic recording material composed of closely spaced magnetic particles in a thermoplastic resin binder operable to provide a cavity or pit therein when subject to an intense pulse of laser radiation or the like. Such a record member may be subject to the following recording techniques, one or more of which may be utilized per record member to increase the recording density and/or permit two or more reproduction transducers or scanners to be employed for reading at one time or at different times depending on the availability of each:

a) A pulse laser beam may form a cavity or pit in the surface stratum or through the recording layer of binder and magnetic particles. The recordings may be read by electro-optically sensing the pits or cavities or by a magnetic pick-up sensing the lack of magnetic field caused by each cavity when a uniformly magnetized layer is so formed with recording cavities.

b) A pulsed laser beam may also be employed to selectively discharge select spot-like areas of a uniformly magnetized magnetic recording layer or stratum coated on or laminated to the record member substrate to effect such pulse recording with heat.

c) A conventional magnetic recording transducer or head engaging or disposed close to the surface of the record member may be pulse modulated with electrical signals for effecting pulse recordings of the types described in the magnetic recording layer of the record member by selectively orienting spot-like portions of the magnetic recording material.

Two or three of the recording techniques described above may be employed with respect to a single record member to provide a plurality of different recordings which may be read by either or both an electro-optical reader and a magnetic transducing arrangement. Depending on the type(s) and arrangement of recording transducers, such different recordings may be effected simultaneously and/or sequentially along the same or different record tracks of the record member, and may be read simultaneously and/or sequentially by the same reading unit or by different reading units.

d) While a magnetic pick-up may be employed which will read any of the three types of recordings described in the magnetic layer of the record member, a laser beam reading arrangement using a photoelectric detector of reflected radiation may be employed to detect recordings defined by microcavities formed by the same or another laser and, in certain arrangements, may also be employed to detect and read recordings defined by variations in magnetic domain orientation or disorientation due to laser heating of a microminiature area of the magnetic layer using a pulsed laser beam generated by a computer controlled laser in synchronization with the relative movement between the record member and the beam axis.

7. In yet another embodiment of the invention, magnetic or optically readable recordings may be recorded along one or more tracks of a record member, such as a tape, card or disc, in the form of spot or pulse recordings which may be varied in alignment and/or shape as described so as to magnetically or optically discriminated at each pulse or spot location of the record track by a single magnetic or electro-optical pick-up. A magnetic pick-up, for example, which has its pole piece defining gap aligned at a select angle with respect to the magnetic record track being scanned, will sense each domain recording it scans and the intensity or amplitude of the signal generated by such pick-up as it scans a pulse recording will be a function of the angle at which the magnetic domain extends with respect to the direction or axis of the track. If the recording means is such as to provide, for example, pulse recordings defined by domains which may be variably applied to extend at least eight different angles to the longitudinal axis of the recording track, then essentially what is derived is the ability to record a select on eight different bits of information, or a byte of information, at each recording location or spot of the record track, each of which differently angulated recordings may be detected and discriminated from the others at such location by the amplitude of the pulse signal output by the pick-up when scanning such recording location. Similarly, if each spot recording is of a shape which is optically discriminable from seven other shapes which may be recorded at each spot location, its shape may be electro-optically detected by suitable electro-optical scanning means and indicated by the amplitude or other characteristic of the pulse signal output by the scanning mean so as to provide a byte of information at each spot recording location of the record member, thereby greatly increasing the recording density of the record member. If such electro-optically scannable recording is defined by recordings of the types illustrated in the drawings which are elongated in shape and vary in angle to the axis of the record track, then a photoelectric detector or cell with a fixed similarly shaped aperture will output signals which vary in accordance with the angle of the pulse recording and eight differently angulated pulse recordings may be provided, one at each recording location, to define essentially a byte of information at each location.

8. In a particular form of the invention defined in the preceding paragraph, ten differently shaped or angulated spot-like recordings may each represent one of the numerical characters 1 to 9 and 0, and/or twenty six alphabetical characters, such as the letters A to Z of the English language, to permit each spot-like recording to represent and be easily read as an alpha-numeric character to define respective digital information in numerical representing form, and words of speech recordings which do not require costly reading and electronic analyzing means to discriminate characters. Combinations of spot-like recordings defining both select alphabetic and numeric characters and binary indications of numbers may also be employed in the form of magnetic domains which ar varied in their alignment with respect to the axis of the record member, and/or optically or electro-optically scannable recordings which vary in shape and/or angle to the axis of the record track. Thus both the decimal and binary systems may be employed as recordings on the same record member along respective or separate tracks thereof.

Figure 16:
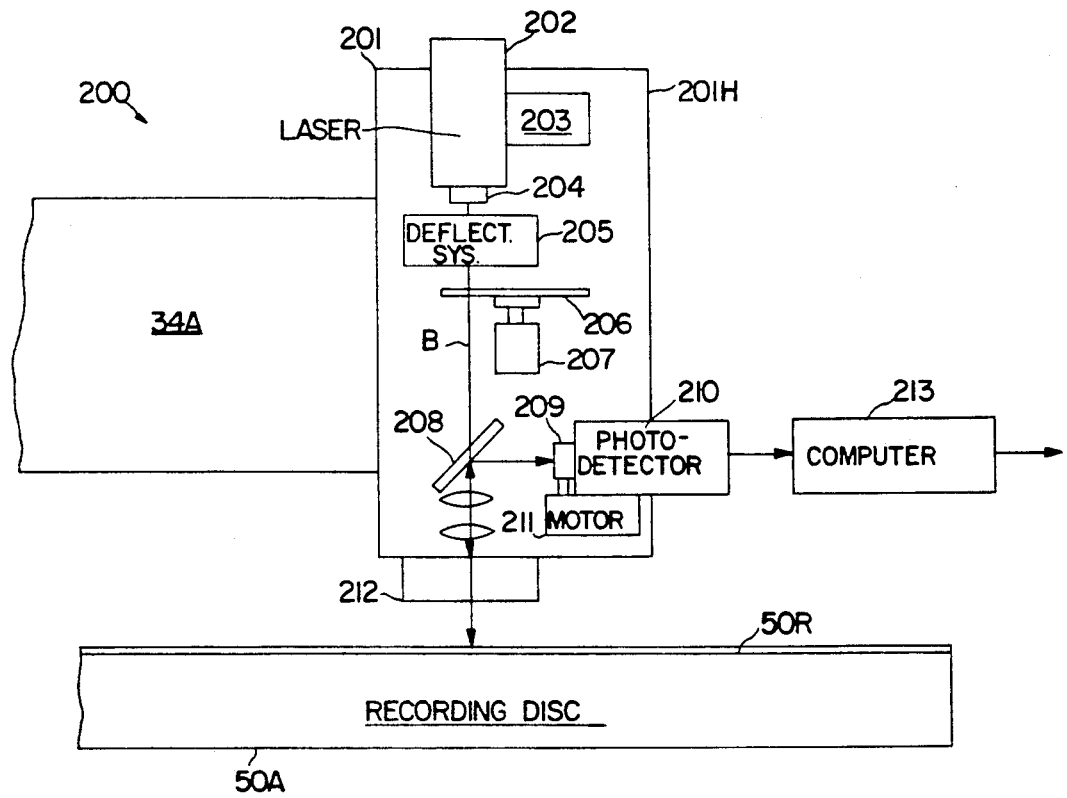
FIG. 16, s a partial side view with schematic representations of an electro-optical recording and reading arrangement employing a laser for scanning a rotating disc record member.

In FIG. 16 certain details are shown of the hereinbefore described form of the invention wherein either variably shaped microminiature indicia are disposed along parallel record tracks of a rigid or flexible disc, tape or card, or microminiature elongated pulses or indicia of the types shown in FIGS. 6 to 15 are recorded along a record track or tracks at predetermined locations thereof, and the particular angle or orientation of each elongated recorded indicia defines a particular code or byte value. For example, in a conventional byte data system, eight or ten bits in parallel or series, with each bit spaced apart from the others, may define a particular byte of data or a select digit of a ten digit number. If eight or ten differently shaped indicia are recordable at a select recording location of a record track wherein each shape is electro-optically or optically detectable and discriminated from the other shapes, such as when an electro-optical detector generates a electrical code which is different from the electrical codes generated when it detects others of the microminiature shapes during a scanning operation, then such code or signals derived therefrom may define a particular byte of data in an information system. Similarly, the optical or electro-optical detection of the angles of elongated microminiature recordings of the types shown in FIGS. 6 to 15 may be employed to generate different bytes of data or codes depending on the angles at which such recordings are disposed with respect to the axis of the record track containing same.

In FIG. 16, an electro-optical recording and/or reproducing apparatus 200 includes an arm 34A pivotally or otherwise movably supported above a record disc 50A as part of an assembly which is similar to that shown in FIGS. 4 and 5. Supported at the end of arm 34A is an assembly 201 including a housing 201H containing a laser 202 operable under control of an input controller 203 to generate and pass pulses of laser radiation from an output 204 thereof. Although not necessary in a basic form of the embodiment, a deflection system 205 is shown beyond the output 204 of the laser for receiving and controllably deflecting the laser beam B to cause it to scan different portions of a mask 206 to pass the beam through select mask windows or openings of different select shapes or orientations located along different circular tracks of the mask. The mask is a flat disc rotated at high speed about its central axis by a gear motor 207 which supports a platform on its shaft, on which platform the disc shaped mask is supported. If the disc 206 has a sufficient number of shaped or differently oriented mask openings along a single circular track thereof, the beam deflection system 205 may be eliminated.

After passing through a select opening in the mask 206, the beam B, in the recording mode, is directed through a focusing or output lens system 212 against that portion of the rotating disc 50A which the scanning axis of the operating head assembly is aligned with, thereby effecting a microminiature recording in a recording layer 50R of the disc, such as the outer layer thereof which is sensitive to such selectively shaped pulse of light energy. If the pulse of high-energy laser radiation passed through the select opening in the mask 206 is of short enough duration with respect to the rotational speed of the disc 50A, the spot-like recording effected by such pulse will be substantially the cross-sectional shape of the radiation pulse or a modified form thereof which is different from the micro-recordings formed in recording layer 50R by pulses of similar duration radiation shape formed by passing such pulses through respective differently shaped openings in the mask 206.

During the reproduction mode of operation, laser 202 or a different laser (not shown) in housing 201H may be employed to generate a continuous beam of lower intensity than the recording beam, which beam B is passed though a half silvered mirror 208 along the scanning axis of the head 201 while the mask disc 206 is eliminated or stopped in a manner to permit a large opening or window thereof to pass the beam B unaffected by the mask to the output optics 212 against a select track of the recording layer 50R of the disc 50A. Reflections of the light of the beam B after it has intersected respective recordings of different or differently oriented microrecordings, are passed through the optics of lens system 212 against the reflecting surface of mirror 208, from which such light is reflected to an input 209 of a photoelectric detector 210. The photoelectric detector 210 may comprise a single photoelectric cell or an array of microminiature cells operable to generate electrical signals which vary in accordance with the shape of the recording area being scanned with the laser radiation and defined by the physical characteristic of the reflected light. Such variable signals may be computer processed and analyzed to automatically provide electrical code signals on an output which code signals define the differently shaped or oriented (spot-like) microminiature indicia scanned with the reading laser light for use in an information storage and reproduction system employing the coded data to be generated.

In a modified form, FIG. 16 shows a motor or solenoid 211 operating a mask 209 to selectively position differently shaped openings or windows of the mask in line with an aperture for the photoelectronic detector or detectors 210 so as to provide a simple means for optically correlating or discriminating recordings of different select shapes. However, such motor and mask 209 may be eliminated if an array of microminiature solid state photoelectric diodes or the like defines the photoelectric detector 210 and may discriminate different recording shapes or orientations by the electrical signals output thereby to a computer for analysis.

In a modified form of the embodiment shown in FIG. 16, the beam deflection system 205 may be disposed in the housing 212 or thereabove to selectively deflect the read and/or write beam radially with respect to the rotating disc and arm assembly 34A to permit rapid radial scanning of data on two or more parallel circular tracks of the disc 50A.

In the automatic operation of apparatus 200, a computer (not shown) is employed to control the pulsed operation of laser 202, the beam deflection system 205 (when utilized), the motor 211, etc. in accordance with the movement and/or track location of arm 34A and the rotation of the disc 50A which may be determined by detecting select indicia or codes recorded in the recording layer 50R, or by counting pulses generated by one more angular resolvers driven by the means rotating disc 50A and arm 34A.

9. In still another form of the invention, automatic scanning, detection and discrimination of any of the described variably oriented or variably shaped indicia recordings may be more easily effected by effecting controlled vibrational movement of the scanning transducer, such as a magnetic head, a laser or an optical component such as a mirror or prison which received the laser light beam and directs same against the magnetic or optical record track containing such recordings closely spaced from each other. For example, the light beam may be laterally vibrated at high frequency laterally back and forth with respect to the longitudinal axis of the record track while either the beam or the record member is driven to effect scanning movement along or parallel to the record track being scanned. The light reflected from the record track and areas adjacent thereto may photo-electrically detected by one or more photoelectric cells, such as an array of microminiature solid state photodetectors, wherein the output electrical signals are computer processed and analyzed in a manner to detect the orientation and/or shape of each indicia, and thus discriminate the various indicia from each other as described above. Such transducer or mirror vibration may be effected, for example, by means of a piezoelectric transducer which is mechanically coupled or suitable secured to the scanning transducer, mirror or prism in a manner to effect its vibration at the frequency the piezoelectric transducer is vibrated or a harmonic thereof depending on the mechanical arrangement.

For bit recordings in the range of 10,000 to 50,000 per inch or greater, longitudinal scanning speeds in the range of five to fifty feet per second will require vibrational frequencies to be varied between 50,000 and 1,000,000 cycles per second to properly laterally scan each bit recording by such technique.

10. In yet another embodiment, ultra-high density recording of the types described may be effected in a film of metal, such as copper disposed against a rigid or floppy disc shaped substrate by vacuum deposition, wherein the surface of such film is formed of finely divided copper crystals and the recordings in one or more tracks thereof are formed by laser beam pitting, or a thin transparent plastic or ceramic coating thereon and having opaque or light diffusing areas for absorbing or diffusing reading laser light directed as a narrow beam thereagainst. The recordings may also be formed of tiny, three-dimensional crystals of silver controllably added to the copper film, which silver crystals may be several atoms or more across and which, during reproduction scanning with a laser light beam, serve as microscopic antennas and broadcast light at the second harmonic frequency in a process which is more efficient than light broadcast from the original smooth copper surface. By employing a suitable photoelectric detector or microminiature array thereof in combination with suitable micro-optics, such micro-crystal recordings may be electro-optically detected at a much higher density than conventional micro-image recordings, such as micro-cavity recordings are provided and detected.

What is claimed is:

1. A data transducing apparatus comprising:
   a) a first support,
   b) first means supported by said first support for supporting a record number,
   c) second means supported by said first support for generating and directing a beam of recording radiation against a record member supported by said first support and for recording a plurality of closely spaced discrete indicia along a select portion of a record track of said record member, wherein such indicia are substantially equispaced from each other and wherein certain of said discrete indicia have unique shapes relative to others of said indicia,
   d) third means for generating and directing a beam of reading radiation at said record member and for effecting relative scanning movement between said beam and said record track containing said indicia to cause said reading radiation beam to scan said record track and reflect from said plurality of discrete indicia recorded therealong,
   e) fourth means for electro-optically detecting reflections of said reading radiation beam from said record track and for generating information signals which vary in a accordance with variations in the shapes of the indicia scanned by said reading radiation, and
   f) fifth means for processing and analyzing said information signals generated by said fourth means and for generating coded electrical signals indicative of the information defined by said information signals.

2. A data transducing apparatus in accordance with claim 1 wherein said second means comprises a laser, further including means for deflecting the beam of said laser to permit it to scan various areas of said record member along said record track.

3. A data transducing apparatus in accordance with claim 1 wherein said second means includes a mask containing a plurality of differently shaped window portions which are smaller than the cross section of said recording radiation beams, said mask being located to receive the radiation of said beam, and further including means for controlling relative movement between said mask and said recording radiation beam before said beam intersects said record member to cause said beam to pass through select window portions of said mask and change the shape of the beam passing through said mask to said record member.

4. A data transducing apparatus in accordance with claim 1 including a movable mask associated with said fourth means for discriminating the radiation reflected from said record member to said means for electro-optically detecting said radiation, and sixth means for controllably varying the relative positioning of said electro-optical means during a scanning operation.

5. A data transducing apparatus in accordance with claim 1 wherein said record member is a disc, and further comprising means for power rotating said disc on said first support, an arm supported for movement across said disc on said first support as said disc is rotated, and wherein said second and third means are supported at the end of said arm.

6. A data transducing apparatus in accordance with claim 1 including means for oscillating said beam of reading radiation lateral to said record track of said record member.

7. A data transducing apparatus in accordance with claim 1 wherein said record member is coated with a thin film of a first metal, and crystals of a second metal are formed on a surface of said first metal film as crystal formations defining a separate recording indicia, and wherein said fourth means is operable to detect individual of said indicia.

8. A data transducing apparatus comprising:
   a) a first support,
   b) first means supported by said first support for supporting a record member,
   c) second means supported by said first support for generating and directing a beam of recording radiation against a record member supported by said first support and for recording a plurality of closely spaced discrete indicia along a select portion of a record track of said record member, wherein such indicia are substantially equispaced from each other, are of elongated configurations of substantially similar shape, and wherein certain of said indicia are differently angled with respect to the axis of said record track than the angles of others of said indicia, d) third means for generating and directing a beam of reading radiation at said record member and for effecting relative scanning movement between said beam and said record track containing said indicia to cause said radiation beam to scan said record member and reflect from the indicia recorded therealong, and e) fourth means for electro-optically detecting reflections of said radiation of said reading radiation beam from said record track and for generating information signals which vary in a accordance with variations in the angles between the longitudinal axes of said indicia and the axis of said record track.

9. A data transducing apparatus in accordance with claim 8 wherein said record member comprises an erasable record disc and said first means is operable to rotate said disc, and further comprising an arm supporting said second, third and fourth means, and means for guiding said arm across a rotating record member, power operated means for driving said arm across said record member to permit the radiation generated by said second and third means to scan a select track of said record member and means for receiving and processing electrical signals generated by said fourth means and for generating data defined by select indicia scanned by said reading radiation beam.

10. A method for transducing information with respect to record members comprising:
   a) generating a first beam of radiation, which radiation beam has a first elongated cross-section for defining the shape of a recording to be made therewith,
   b) effecting first controlled relative scanning movement between said first radiation beam and a select track of a record member while controllably pulsing said beam to cause said beam to intermittently effect a plurality of space separated indicia recordings in a plurality of select recording locations of the material of said select track of said record member, which recordings are defined by first elongated indicia configurations which extend at a first angle to the longitudinal axis of said select record track,
   c) thereafter again effecting controlled relative scanning movement between said radiation beam and said select record track of said record member to cause said radiation beam to intersect select further recording locations of said record member to provide second recordings in the recording material of said select track of said record member, which second recordings have shapes which extend at second angles to the longitudinal axis of said select track.

11. A method in accordance with claim 10 wherein said first and second recordings are effected by the same radiation beam.

12. A method in accordance with claim 10 wherein said first and second recordings are effected by the same radiation beam during a single scanning sweep of said select track of said record member.

13. A method in accordance with claim 10 wherein said first and second recordings are effected by the same radiation beam during respective different scanning sweeps of said select track of said record member.

14. A method in accordance with claim 10 wherein said first and second recordings are effected by the same radiation beams, each having substantially the same cross sectional shape but angled differently with respect to the longitudinal axis of said record member.

15. A method in accordance with claim 10 wherein said first and second recordings are effected by rotating the same radiation beam about the axis along which it is generated to vary the angle of the elongated recordings effected along said record track between said longitudinal axis of said select track and to thereby effect said first and second recordings.

16. A method in accordance with claim 10 wherein said first and second recordings are effected by the same radiation by automatically rotating said beam about its longitudinal axis so as to cause the elongated areas of said record member intersected by said beam to be selectively changed in its attitude with respect to the longitudinal axis of said select record track.

17. A method in accordance with claim 10 wherein said first and second recordings are effected by the same radiation beam by automatically causing said beam to scan during each pulsing of said beam whereby the scanning movement of said beam during each pulsing thereof is in a direction lateral to the longitudinal axis of said record track.

18. A method in accordance with claim 10 further comprising the step of reproducing selected of said first and second recordings by electro-optically scanning and discriminating said first from said second recordings by detecting one of said recordings to the exclusion of the others.

19. A method in accordance with claim 10 further comprising the step of reproducing selected of said first and second recordings, and discriminating one from the other by electro-optically detecting each of said recordings as respective trains of pulse signals and electronically discriminating each of said pulse trans form the other.

20. A method for transducing information with respect to a record member comprising:
   a) subjecting a magnetic recording layer of a record member to the heat of a pulsed beam of radiation and effecting a first recording along a select portion of a select record track of said record member,
   b) subjecting said magnetic record layer of said record member to a pulsed, limited magnetic field and effecting a pulse magnetic recording wherein by selectively orienting an area of the magnetic recording layer, and
   c) reproducing information from said record member by scanning selected of the recordings provided therein with a magnetic pick-up and generating output electrical signals defining said recordings.

21. The method of claim 20 wherein the step of reproducing information from said record member further comprises scanning selected of the recordings provided therein with a photoelectric detection means.

22. A system for recording data on a record member having at least one record track, comprising:
   (a) a transducer having a magnetic recording head disposed at its operative end;

(b) support means for supporting the transducer so that the recording head is positioned in close operable relationship with the record member;

(c) means for pivotally coupling the transducer to the support means so that the recording head can be rotated about an alignment axis which extends from the transducer to the surface of the record member;

(c) control means for selectively rotating and positioning the recording head at selected rotational angles relative to the alignment axis; and (d) means for energizing the recording head while it is positioned at each of plural selected angles relative to the alignment axis to record corresponding plural groups of discrete data recordings along the same length of the record track, wherein each group of discrete data recordings is defined by plural magnetic domains formed parallel to each other and to its corresponding selected angle of the recording head.

23. The system of claim 22 further comprising means for projecting the transducer in the direction of the alignment axis to vary the placement of the recording head relative to the surface of the record member.

24. The system of claim 22 further comprising means for reading the plural discrete data recordings.

25. The system of claim 22 wherein the recording head of the transducer includes pole pieces and a recording gap having a longitudinal axis which defines the selected rotational angle of the recording head relative to the alignment axis.

26. The system of claim 25 wherein the control means rotates and positions the recording head so that the recording gap defines two selected angles relative to the alignment axis, the selected angles being at right angles relative to each other.

27. The system of claim 25 wherein the energizing means is intermittently energized while the recording head is positioned at a first of the two selected angles to intermittently generate a magnetic field across the recording gap of the pole pieces in the vicinity of the surface of the record member, thereby generating corresponding pulse recordings on the record member in the form of a plurality of closely spaced magnetic domains along a selected length of the record track, the longitudinal axes of the magnetic domains extending parallel to each other and to the first selected angle relative to the alignment axis.

28. The system of claim 27 wherein the energizing means is intermittently energized while the recording head is positioned at the second of the selected angles to intermittently generate a magnetic field across the recording gap of the pole pieces in the vicinity of the surface of the record member, thereby generating corresponding pulse recordings on the record member in the form of a plurality of closely spaced magnetic domains along the same selected length of the record track, the longitudinal axes of the magnetic domains extending parallel to each other and to the second selected angle relative to the alignment axis.

29. The system of claim 22 further comprising multiple transducers, and wherein the control means selectively rotates and positions the recording head or each transducer at selected angles relative to a respective alignment axis extending from each transducer to the surface of the record member.

30. The system of claim 29 wherein the respective alignment axis of each transducer is offset from a longitudinal centerline of a recording track of this record member.

31. The system of claim 30 wherein the energizing means includes means for intermittently energizing each of the transducers to provide respective offset arrays of magnetic domains on the same selected length of the recording track.

32. The system of claim 31 wherein the respective arrays of magnetic domains at least partly overlap one another.

33. The system of claim 22 further comprising:
(a) means for supporting the record member; and
(b) drive means for causing controlled relative movement between the record member and the recording head of the transducer.

34. A system for recording data on a record member having at least one record track, comprising:
(a) transducer means having a recording head disposed at its operative end for mounting plural recording transducers thereon in close spaced relationship to one another and at unique axial angles relative to an alignment axis extending from the transducer means to the surface of the record member;
(b) support means for supporting the transducer means so that the recording head is positioned in close operable relationship with the record member; and
(c) means for energizing selected ones of the plural transducers to record corresponding plural groups of discrete data elements along the same length of the recording track, wherein each group of discrete data elements comprises plural magnetic domains formed parallel to each other and to the unique axial angle of its corresponding transducer.

35. The system of claim 34 further comprising means for projecting the transducer means in the direction of the alignment axis to alter the placement of the recording head relative to the surface of the record member.

36. The system of claim 34 wherein each of the plural recording transducers has a recording gap, and wherein the transducers are mounted with the recording gaps thereof aligned relative to a longitudinal axis of the recording track.

37. The system of claim 34 wherein each of the plural recording transducers has a recording gap, and wherein the transducers are mounted with the recording gaps thereof offset relative to each other and a longitudinal axis of the recording track.

38. The system of claim 34 further comprising means for reading each of the plural discrete groups of data elements recorded on the record member.

39. The system of claim 34 further comprising:
(a) means for supporting the record member; and
(b) drive means for causing controlled relative movement between the record member and the recording head of the transducer.

40. A magnetic recording and reproduction apparatus comprising:
(a) a record member having at least one recording track thereon, the recording track having a longitudinal axis and centerline,
(b) a transducer assembly having a recording head disposed in close operational relationship to the recording member;
(c) energizing means for generating a magnetic field at the recording head of the transducer; and (d) means for causing the recording head to record plural discrete groups of data elements along the same length of the recording track, wherein each discrete group of data elements is uniquely oriented relative to the longitudinal axis and centerline of the recording track.

41. The apparatus of claim 40 further comprising means for reading from the recording track each of the discrete groups of data elements.

42. The apparatus of claim 40 wherein the means for causing the recording head to record plural discrete groups of data elements along the same length of the recording track comprises:
   (a) means for selectively rotating the recording head about an alignment axis extending from the transducer assembly to the surface of the record member; and
   (b) control means for selectively controlling the energizing means to cause the recording head to record each discrete group of data elements while the head is fixed at a unique angle relative to the alignment axis.

43. The apparatus of claim 42 further comprising:
   (a) means for supporting the record member,
   (b) drive means responsive to the control means for positioning a given length of the recording track in alignment with the recording head so that plural discrete groups of data elements can be recorded thereon.

44. The apparatus of claim 40 wherein the transducer assembly includes plural transducers mounted on the recording head at unique axial angles relative to an alignment axis extending from the transducer to the surface of the recording member.

45. The apparatus of claim 44 wherein the means for causing the recording head to record plural discrete groups of data elements along the same length of a recording track includes control means for controlling the energizing means to cause selected of the plural transducers to record corresponding groups of discrete data elements at unique axial angles relative to the alignment axis.

46. The apparatus of claim 44 wherein the plural transducers are mounted offset from centerline of the recording track.

47. The apparatus of claim 40 wherein said means for reading from the recording track each of the discrete groups of data elements comprises a reproduction head mounted on the transducer assembly.

48. The apparatus of claim 40 wherein the recording member comprises a magnetic disc having plural recording tracks extending radially from the center thereof.

49. The apparatus of claim 48 further comprising means for aligning the transducer assembly with selected tracks on the magnetic disc.

50. The apparatus of claim 45 wherein the control means causes the energizing means to simultaneously energize the plural transducers to simultaneously record plural groups of discrete data elements.

51. The apparatus of claim 40 wherein the transducer assembly includes plural transducers mounted on the recording head so as to be offset from the longitudinal axis and centerline of the recording track.

52. The apparatus of claim 51 wherein the means for causing the recording head to record plural discrete groups of data elements along the same length of recording track includes control means for controlling the energizing means to cause selected of the plural transducers to record on the recording track corresponding groups of discrete data elements offset from the longitudinal centerline of the recording track.

* * * * *